United States Patent
Steins

(10) Patent No.: US 8,684,412 B2
(45) Date of Patent: Apr. 1, 2014

(54) COLLAPSIBLE TRAILER

(76) Inventor: Karl M. Steins, San Diego, CA (US)

( * ) Notice: Subject to any disclaimer, the term of this patent is extended or adjusted under 35 U.S.C. 154(b) by 0 days.

(21) Appl. No.: 13/437,698

(22) Filed: Apr. 2, 2012

(65) Prior Publication Data

US 2012/0313346 A1    Dec. 13, 2012

Related U.S. Application Data

(63) Continuation-in-part of application No. 11/300,006, filed on Dec. 13, 2005, now Pat. No. 8,146,941.

(51) Int. Cl.
*B62D 53/06*    (2006.01)

(52) U.S. Cl.
USPC ........ 280/789; 280/656; 280/402; 280/415.1; 280/416; 280/418; 280/401; 280/462; 280/482; 280/491.2; 280/40; 280/79.7; 280/414.1; 280/491.3; 280/64; 414/537

(58) Field of Classification Search
USPC .............. 280/656, 789, 402, 415.1, 416, 418, 280/401, 462, 482, 491.2, 40, 79.7, 414.1, 280/491.3, 64; 296/61, 62; 414/537
See application file for complete search history.

(56) References Cited

U.S. PATENT DOCUMENTS

| 6,511,092 B1* | 1/2003 | Chepa | 280/656 |
| 2010/0038391 A1* | 2/2010 | Cumbie | 224/502 |

* cited by examiner

*Primary Examiner* — Joseph M Rocca
*Assistant Examiner* — Marlon Arce
(74) *Attorney, Agent, or Firm* — Steins & Associates, P.C.

(57) ABSTRACT

A Collapsible Trailer. The trailer is lightweight, but durable, and includes a set of detachable deck segments that can be assembled into a deck. The trailer further includes a suspension assembly that attaches to the deck once the deck is assembled or, alternatively, is permanently attached to one deck segment. Intra-deck segment support is provided by slidable rods that are extendable to bridge between a pair of adjacent segments. Each deck segment has a male edge to be inserted into a female edge to create an exceedingly strong, interlocking hinge-like structure. The deck and trailer can be assembled without the need for any tools. The deck segments, when disassembled, are stackable into a condensed deck stack. A foldable suspension facilitates the stackable storage and transportation of the trailer. The trailer is convertible into a cargo platform that can be attached directly to a conventional trailer hitch receiver on a vehicle.

18 Claims, 12 Drawing Sheets

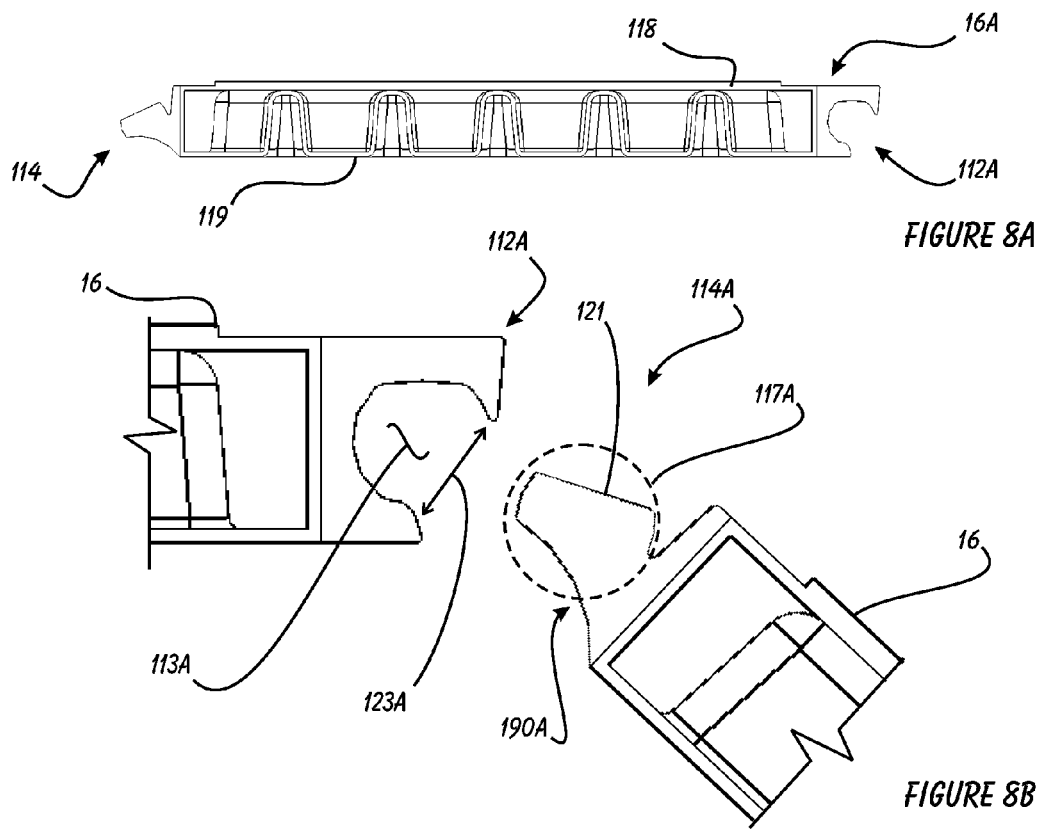
FIGURE 8A
FIGURE 8B
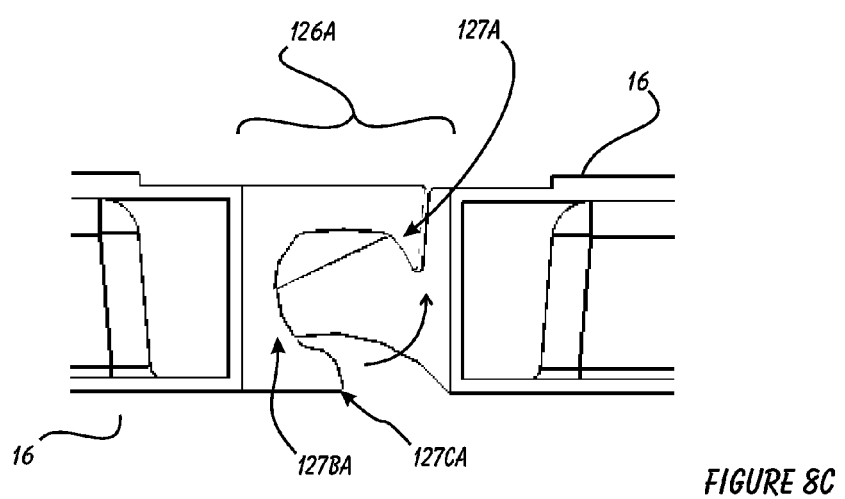
FIGURE 8C

US 8,684,412 B2

COLLAPSIBLE TRAILER

This application is a continuation-in-part of application Ser. No. 11/300,006, filed Dec. 13, 2005 now U.S. Pat. No. 8,146,941.

BACKGROUND OF THE INVENTION

1. Field of the Invention

This invention relates generally to cargo hauling and, more specifically, to a Collapsible Trailer.

2. Description of Related Art

Cars and trucks have become a mainstay of the modern active lifestyle. Unfortunately, due to garaging space limitations, each family is only realistically capable of having two vehicles in any single household. As a result of this, each household must make a choice as to what species of vehicle to obtain, depending upon their particular needs and circumstances. In recent years, that choice has been the Sport Utility Vehicle or SUV's. While the SUV certainly has attempted to "bridge the gap" between the utility vehicle and the passenger vehicle, it has almost gone too far. Certainly, all SUV's have the capability and design to haul a substantial amount of cargo; the problem is that they are many times too nice for this application. As a result, the user must rent or borrow.

SUMMARY OF THE INVENTION

In light of the aforementioned problems associated with the prior devices, it is an object of the present invention to provide a Collapsible Trailer. The trailer should be durable, and include a set of detachable deck segments that can be assembled into a deck. The trailer further should have a suspension assembly that attaches to the deck once the deck is assembled or, alternatively, is permanently attached to one deck segment. The horizontal intra-deck segment support should be provided by slidable rods that would be extendable to bridge the intersection between a pair of adjacent segments. Each deck segment should have a male edge and a female edge; the male edge can be insertible into the female edge to create an interlocking hinge-like structure to provide longitudinal stability along the special plane of the assembled deck. Furthermore, the deck and trailer should be able to be assembled without the need for any tools or additional equipment. In all cases, the deck segments, when disassembled, should be stackable into a condensed deck stack. Additional features should include a foldable suspension that facilitates the stackable storage and transportation of the trailer. Still further, the trailer should be convertible into a cargo platform that can be attached directly to a conventional trailer hitch receiver on a vehicle to transport smaller loads of cargo or the stacked trailer itself.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

FIGS. 8A, 8B and 8C are partial cutaway side views of deck segments of the trailer of FIG. 9;

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Collapsible Trailer.

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a Collapsible Trailer.

The contents of the parent applications (Ser. Nos. 10/150, 601 and 11/300,006) to the instant application are incorporated by reference.

Figure 1:
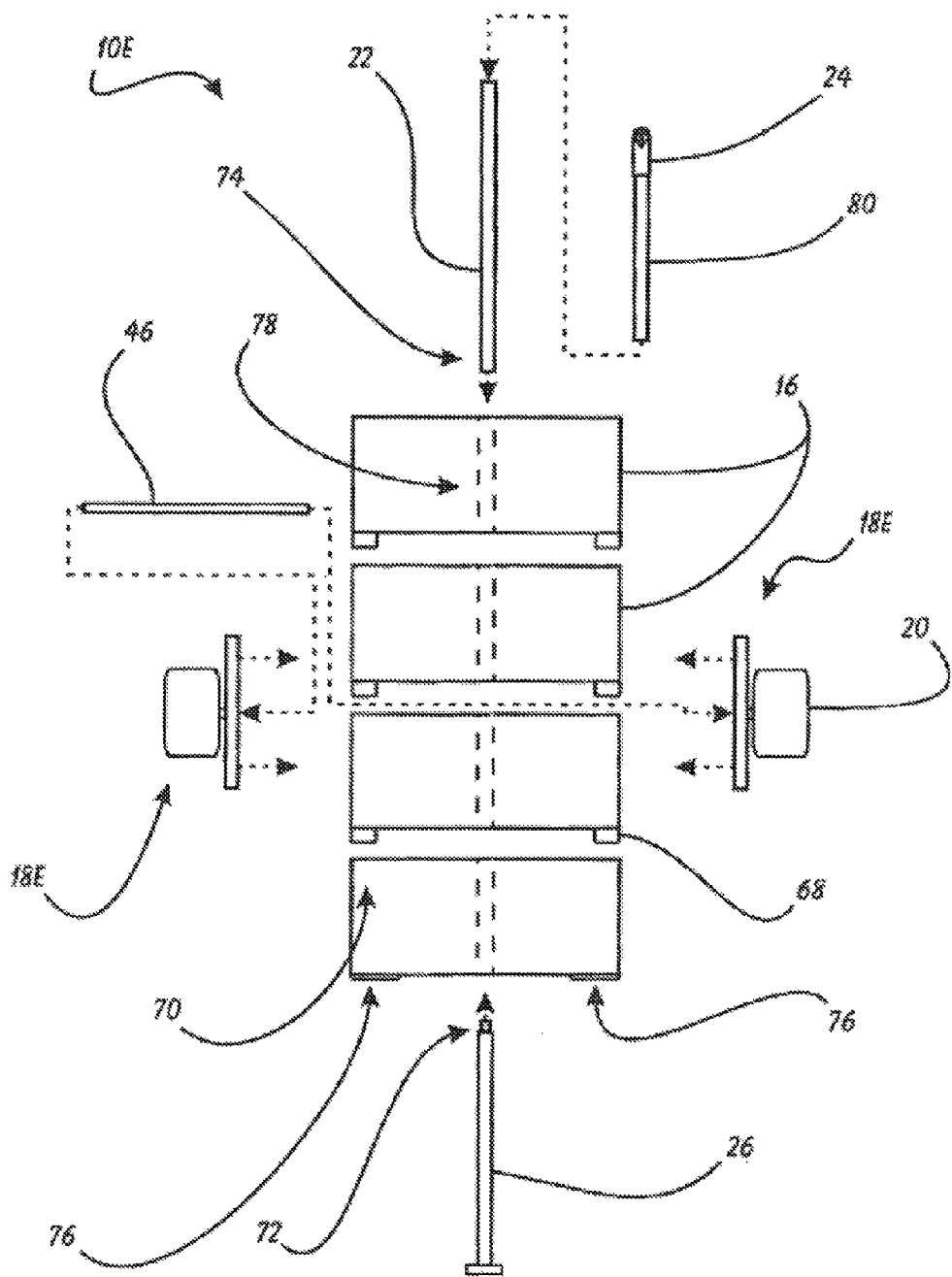
FIG. 1 is an exploded top view of a sixth embodiment of the collapsible trailer of the parent application to the instant invention.

The present invention can best be understood by initial consideration of FIG. 1. FIG. 1 is a perspective view of a sixth preferred embodiment of the present invention.

This trailer embodiment 10E comprises four or more deck segments 16A formed substantially from aluminum, plastic or other high-strength, lightweight material. Some of the deck segments 16 in this embodiment further include a system of interlocking protrusions and sockets, namely, a pair of pegs 68 extending from one side of the segment, and a cooperatively designed pair of sockets 70 on the facing side of the adjacent segment 16, such that when the deck is assembled, the pegs 68 fit into the sockets 70 to prevent twisting of the assembled deck (and to provide generally greater strength).

The segments 16 are further defined by a center bore 78 down their length; this bore 78 is provided to accept the frame members to be discussed further below (i.e. the frame members are actually inserted into the deck segments). The frame in this embodiment 10E comprises a first longitudinal strut 22, a second longitudinal strut 26 and a hitch strut 80. The hitch strut 80 terminates at its front end in the hitch socket 24, and is designed to interlock with the first longitudinal strut 22 at its rear end. The first longitudinal strut 22 is essentially a hollow tube having a substantially round cross-section, and terminating in an engaging socket 74. The engaging socket 74 is preferably a female threaded bore configured to accept an engaging peg 72 formed in the front end of the second longitudinal strut 26. The engaging peg 72 is preferably a male threaded peg for engaging the engaging socket 74. It should be understood that the peg 72 and socket 74 could be reversed (i.e. such that the socket 74 is formed in the second longitudinal strut 26).

To assemble the trailer 10E, therefore, one need simply assemble the segments such that the pegs 68 engage the sockets 70; insert the first and second longitudinal struts 22 and 26 into the (now-aligned) bores 78 and threadedly engage them tightly; attach the hitch strut 80 to the first longitudinal strut 22; and attach the suspension halves 18E and axle 46 to the assembled deck. The suspension halves 18E preferably attach to the sides of the center two segments 16; the axle 46 is attached between the two suspension halves 18E (typically prior to the attachment of the halves 18E to the deck). The order of assembly discussed herein is exemplary only; a number of factors may determine that other orders of assembly (and disassembly) of the trailer 10E are used.

Also shown in this FIG. 1 are two tail light assemblies 76 displayed on the rear surface of the rear segment 16; these tail light assemblies 76 are preferably of the type that are very sleek in order to reduce their interference with the stacking of the segments 16 (when the trailer is disassembled).

While the trailer of FIG. 1 is extremely useful and durable (and, of course, collapsible), it can tend to be very challenging to assemble and disassemble. The cause of this is gauge of metal necessary for the structural members (the large longitudinal struts 22, 24 and 26). In order to eliminate these drawbacks, a seventh embodiment of the collapsible trailer of the present invention has been devised, and is depicted in FIG. 2.

Figure 2:
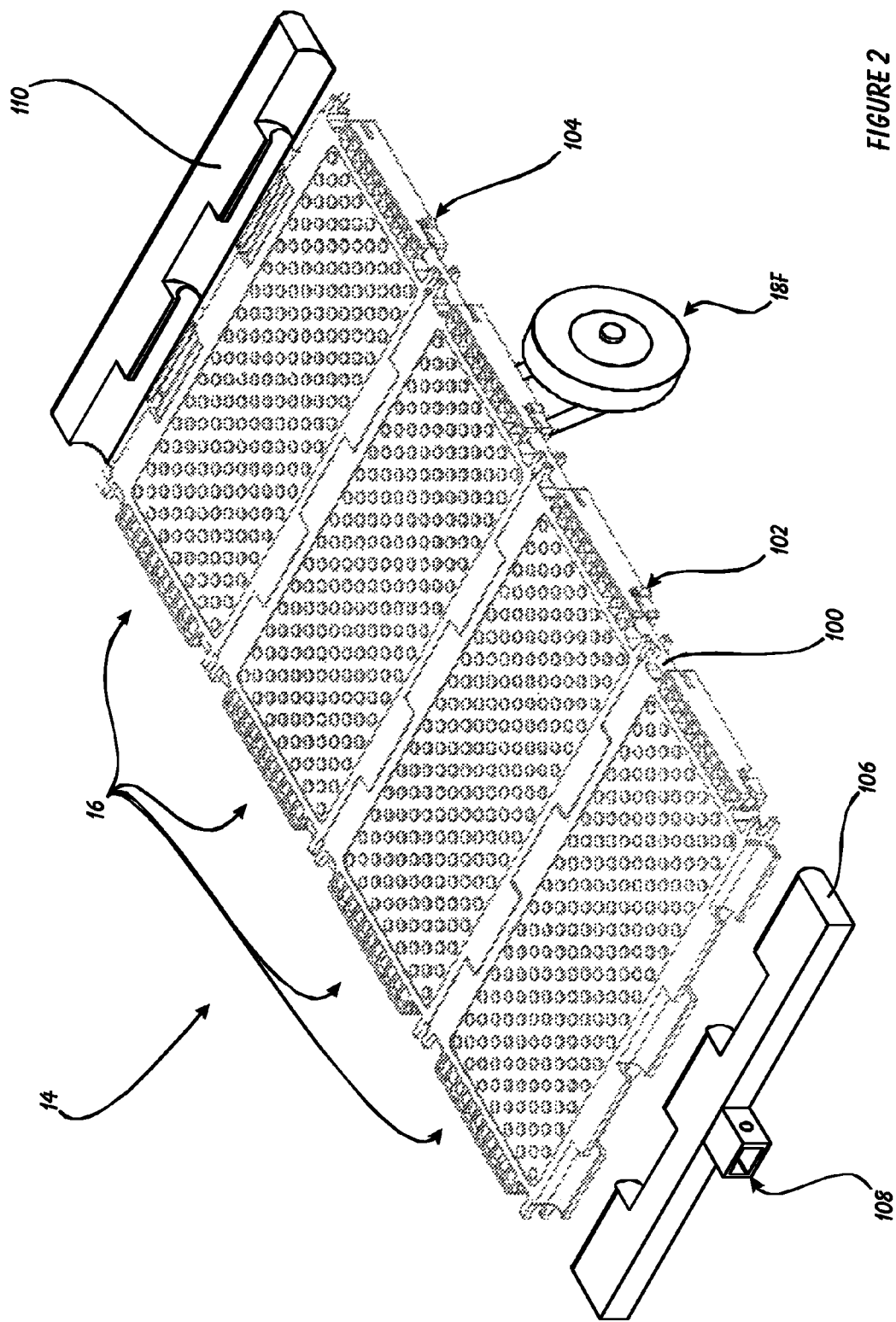
FIG. 2 is a partially exploded perspective view of a seventh embodiment of the collapsible trailer of the present invention.

FIG. 2 is a partially exploded perspective view of a seventh embodiment of the collapsible trailer 14 of the present invention. Like its predecessors, this trailer 14 is composed of a plurality of deck segments 16 made from aluminum, plastic, or some combination of these or other durable and lightweight materials. Unlike most of its predecessors, this trailer 14 does not employ large structural members for load bearing. In this version, deck segments interlock with one another (the interlocked panels resist pulling apart), and then a pair of slidable rods 100 is slid from one segment and partially into the adjacent segment so that each rod 100 bridges the intersection between a pair of interlocked adjacent panels—one rod 100 is at each outer edge of each deck segment 16 (except for one of the two end segments).

Once a rod 100 has been slid into its "bridging" position, the actuating handle 102 (which is what the user grasps to slide the rod 100), can be flipped down (rotated downwardly) until it is recessed into the handle pocket 104. Being fitted into (and possibly clipped into) the handle pocket 104 will prevent the actuating handle 102 from moving and/or permitting the rod 100 to move out of its bridging position between the two panels. A segment 16 and its two rods 100 (and associated minor parts, if appropriate) comprise a "segment assembly" for future reference.

The leading edge of the trailer deck 14 (where the trailer 10F attaches to the vehicle for towing) has a hitch adapter 106. The hitch adapter 106 interfaces with the first segment in the deck 14 by interlocking like any other segment 16 to the first segment 16. This provides a finished look for the front of the trailer 10F while making efficient use of the interlocking structure of the deck panels.

The hitch adapter 106 may be either permanently bolted to the first deck segment (thereby creating a dedicated leading edge deck segment), or it might be detachable like any other deck segment 16. The hitch adapter 106 has a receiver socket 108 extending forwardly. Like a receiver socket commonly used to mount a trailer hitch to the vehicle, the receiver socket 108 is used to mount a hitch strut, such as element 80 in FIG. 1 to the socket 108. The hitch strut 80 is detachable to provide a very compact, conveniently stowed assembly.

A lighting adapter 110 is permanently or removably attached to the last segment 16 in the deck 14. It has an edge configured to interface with the trailing edge of the last segment in the deck 14. There are conventional trailer lights (stop, turn signal) lamps housed within the adapter 110 to provide the necessary safety lighting. The wiring for the lighting adapter is contained within individual segments 16. As the segments 16 are assembled into a deck 14, the wiring from one segment 16 is connected to the adjacent segment 16, either by manually plugging them into each other, or through contact switches.

A suspension assembly 18F is attached to one deck segment 16, usually with permanent fasteners. The assembly 18F, however, is intended to be added to a typical deck segment (thereby converting that segment into a suspension segment). The suspension assembly 18F will most preferably have wheels that fold towards the center of the suspension segment when storing the trailer 10F in detached segments. Although not shown in this diagram, there will also very likely be a fender for each wheel to prevent the tires from throwing rocks up into following vehicles.

In order to make the most efficient use of the deck segment mold (the most likely manufacturing approach), a single deck segment 16 could be cut into two pieces. The result would be two half-segments (one with a male edge and one with a female edge). These two half-segments could be used to create the hitch adapter 106 and lighting adapter 110. Now turning to FIG. 3, we can examine additional specific design features of the segment 16 of this new trailer embodiment.

Figure 3:
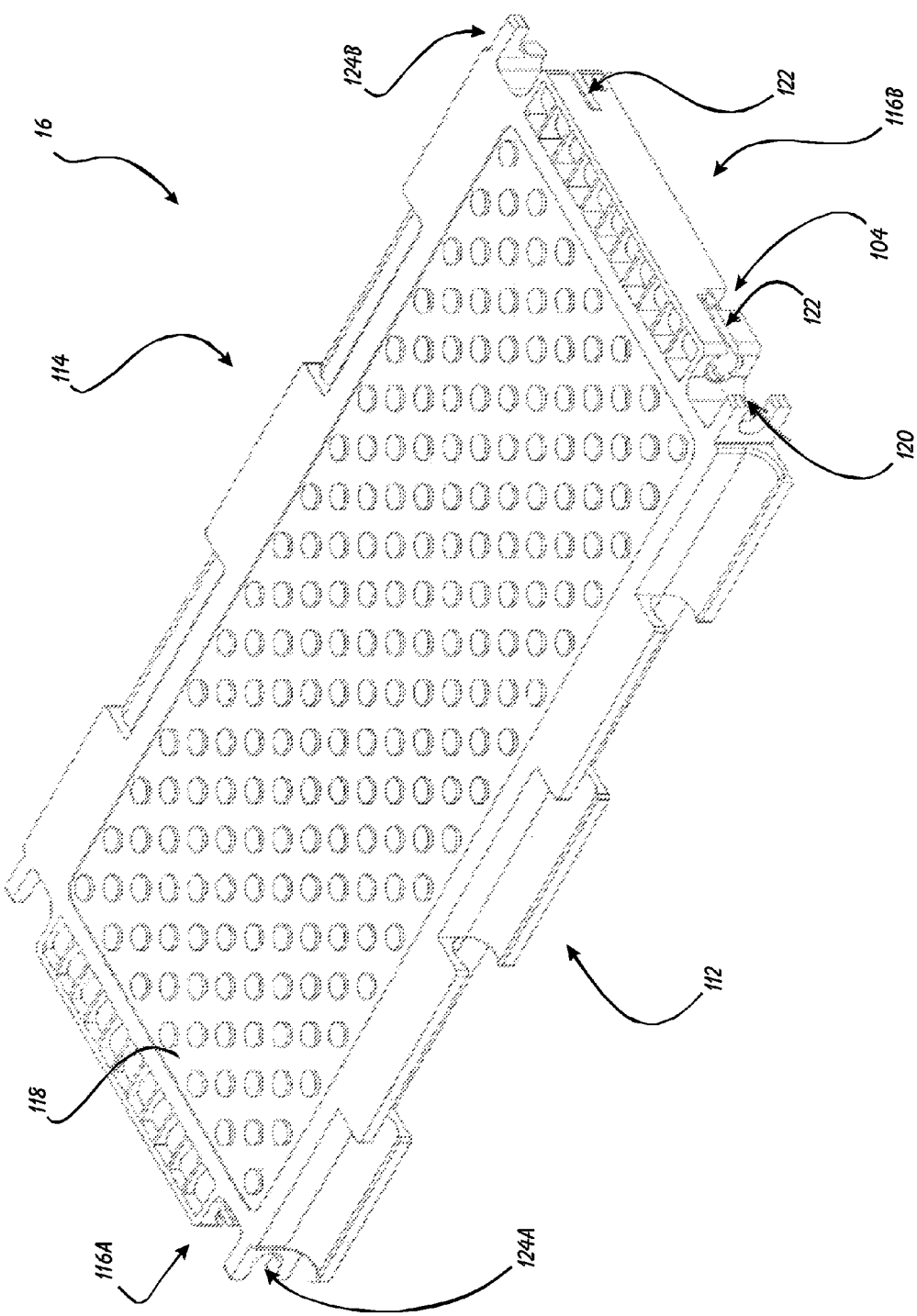
FIG. 3 is a perspective view of a deck segment of the trailer of FIG. 2.

FIG. 3 is a perspective view of a deck segment 16 of the trailer 10F of FIG. 2. In its preferred form, the segments 16 will be molded from a durable material, such as plastic or fiber-reinforced plastic. Should additional strength be necessary, metal structure may be encased within the plastic molded part as well.

The segment 16 is defined by a female edge 112 and a male edge 114 opposite thereto. The edges 112, 114 are specifically designed to interlock with one another to form a structure that looks somewhat like a hinge. When interlocked to an adjacent segment 16, this "hinge" structure will prevent the segments 16 from being pulled apart. Additional detail regarding the hinge will be provided below in connection with FIGS. 6A and 6B.

The two side edges 116A and 116B include very important structure. The side edge 116A and 116B (generically 116) configuration and associated elements is what gives the segment assembly its rigidity and load-bearing strength at the intersection between two segment assemblies. There is a rod bore 120 aligned longitudinally along each side edge 116. The bore 120 permits the slidable rod 100 to be slid along its length to engage or disengage the adjacent segment when assembling or disassembling the trailer.

Figure 4A:
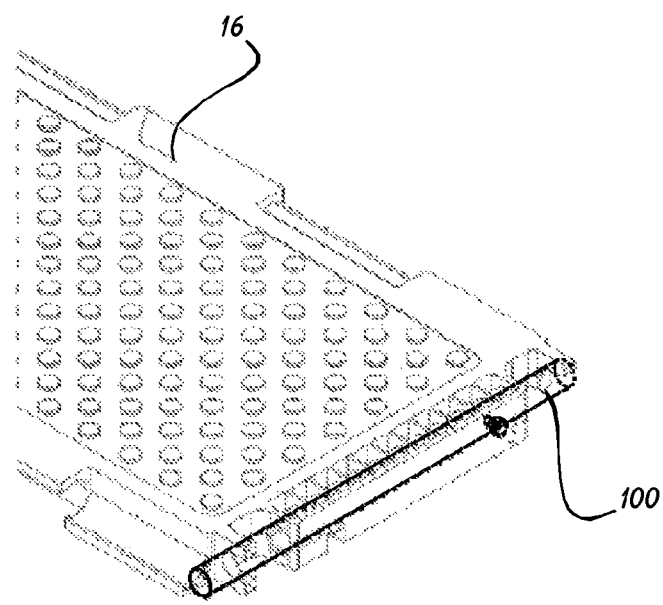
FIGS. 4A and 4B are partial perspective views of the deck segment of FIGS. 2 and 3.
Figure 4B:
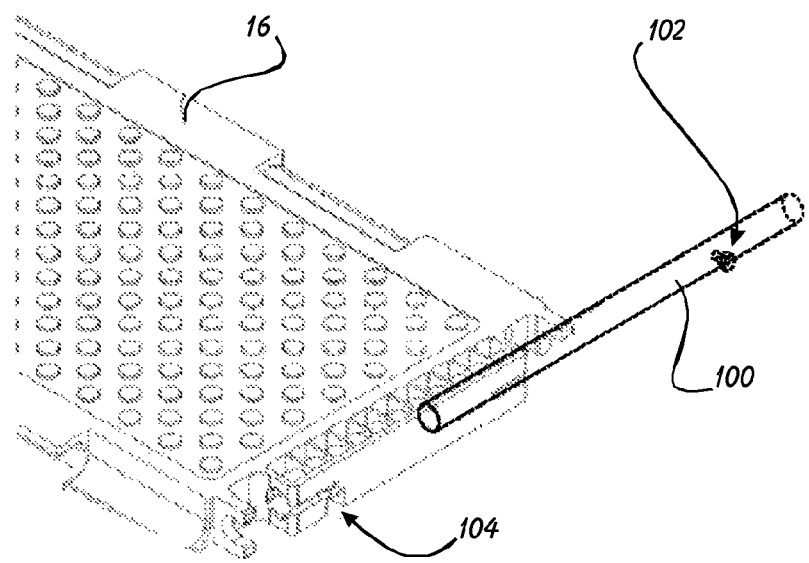

In order to provide additional rigidity to the assembled trailer, bore braces 124A and 124B (generically 124) are provided to extend outwardly from each side edge 116. As should be apparent (and visible in FIG. 2), the slidable bolt will be exposed in the gap between the bore braces 124 and the rod bore 120. These exposed portions of slidable bolt will provide the user with ideal tie-down locations for securing loads to the assembled trailer. FIGS. 4A and 4B provide additional resolution to the functioning of the slidable bolt.

FIGS. 4A and 4B are partial perspective views of the deck segment 16 of FIGS. 2 and 3. In each figure, the slidable rod 100 is shown in hidden lines so that its unique functionality can be clearly understood. As shown in FIG. 4A, when the segments 16 are in storage (disassembled from the trailer), the slidable rod 100 will be found in the "stowed" position. In its stowed position, the entire length of the rod 100 resides within the confines of the longitudinal length of the segment 16. This makes for a very compact, simple structure that is easily handled, even by the most inexperienced user.

FIG. 4B depicts the panel assembly with the slidable rod 100 in the "extended" position. When in the extended position, the rod 100 bridges the intersection between adjacent segments 16, reaching midway between each segment 16. Referencing FIG. 2, it becomes clear that a sort of "domino effect" occurs with the actuation of these rods 100. As segments 16 are interconnected to one another and their rods 100 are slid to bridge the intersection, each subsequent segment's bolt will be slid until it reaches the bolt from the adjacent segment. As a result, all of the bolts are prevented from being disengaged from the extended position by the bolt right next to it in line. This "domino effect" provides structural security to the assembled trailer by making it virtually impossible for the trailer to become disassembled. Furthermore, when fully extended, the rods 100 are rotated so that the actuating handles 102 are captured within the handle pocket 104 of the adjacent segment 16. Once captured within the pockets 104, the actuating handles 102 provide additional resistance to the assembled deck pulling apart.

Figure 5:
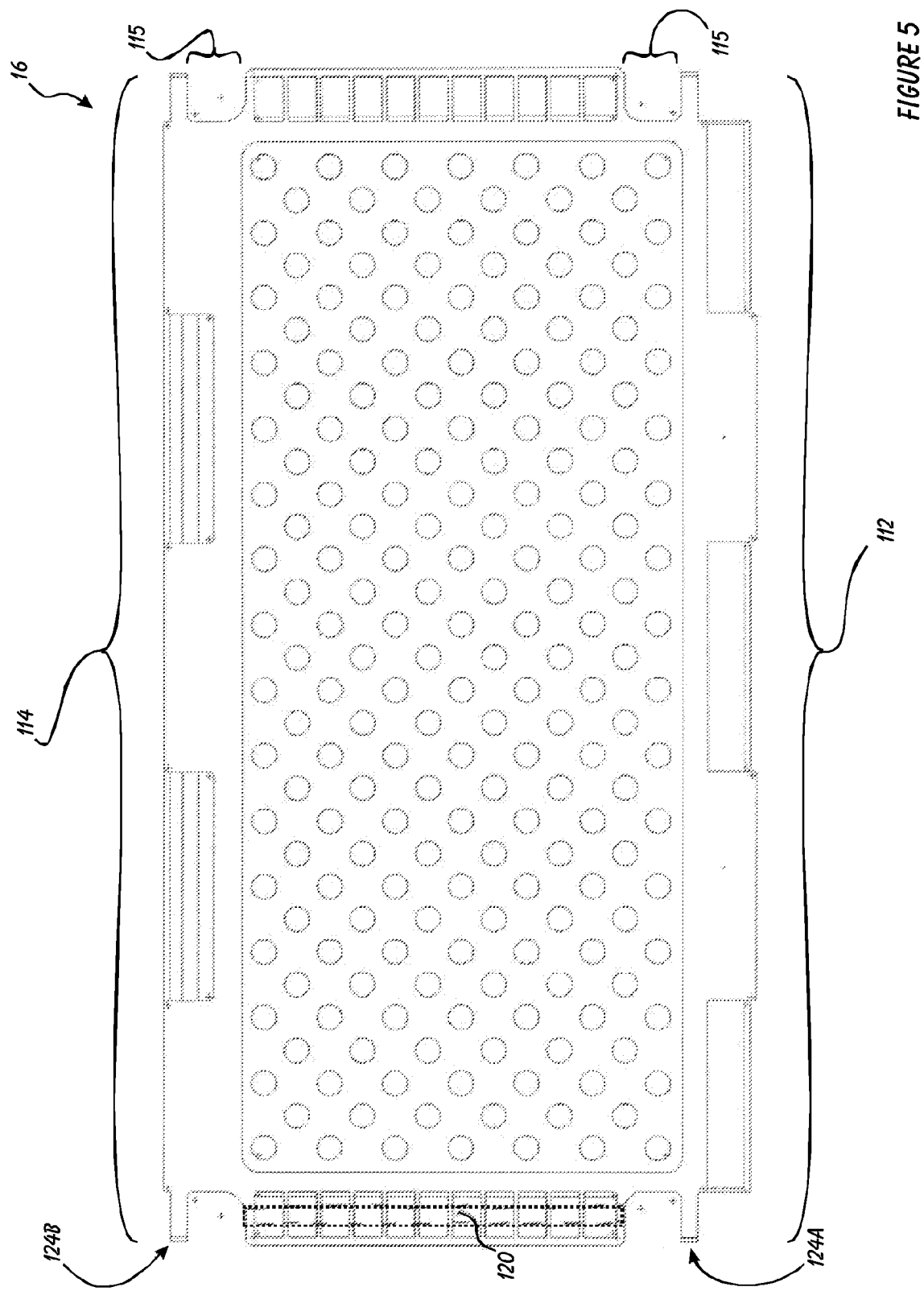
FIG. 5 is a top view of the deck segment of FIGS. 2-4.

FIG. 5 is a top view of the deck segment 16 of FIGS. 2-4. As shown, the female edge 112 runs across virtually the entire transverse with of the segment 16. Similarly, the male edge 114 runs across virtually the identical width of the opposing edge of the segment 16. These two edges 112, 114 are configured so that one segment 16 interlocks with another segment 16.

The top surface of the segment may have the raised "dimples" shown here, or some other design that provides fraction, skid-resistance and conceals scrapes and scratches. On the side edges, there are gaps 115 in between the portion of the segment 16 housing the rod bore 120, and the two bore braces 124A and 124B. As discussed above, the rod is exposed within these gaps 115 to provide locations for tying cargo down to the trailer (or to assist in securely storing the segments). Finally turning to FIGS. 6A and 6B, we can examine the unique interlocking design of these segments 16.

Figure 6A:
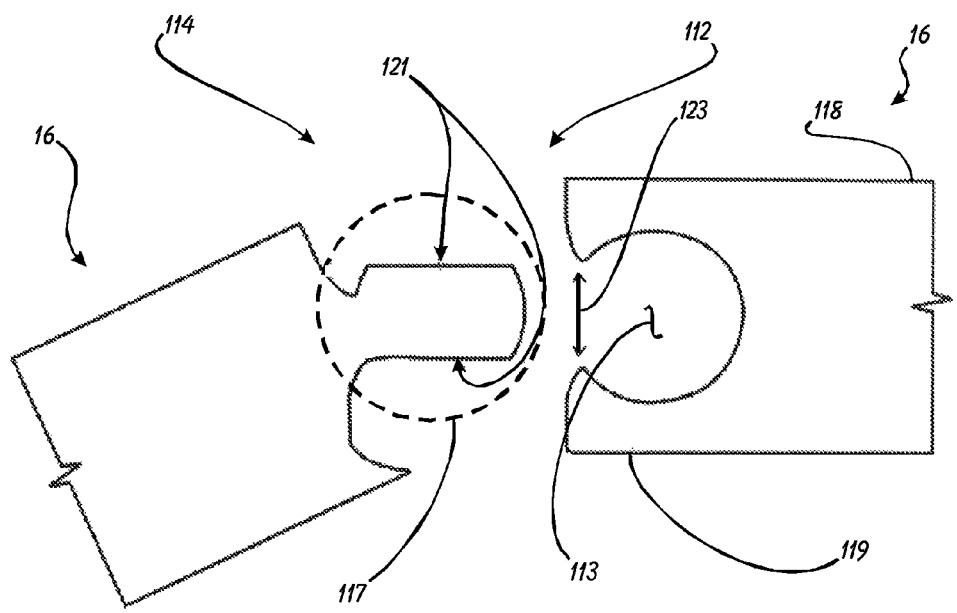
FIGS. 6A and 6B are cutaway side views of the deck segments of FIGS. 2-5.
Figure 6B:
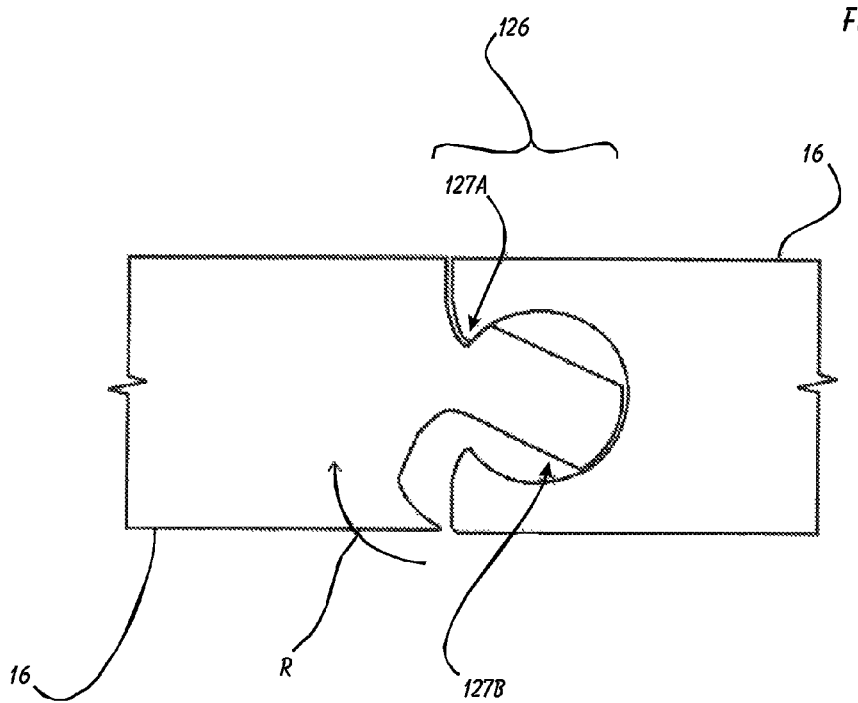

FIGS. 6A and 6B are cutaway side views of the deck segments 16 of FIGS. 2-5. The male edge 114 of each deck segment has a knuckle 117 extending from it. In actuality, to aide in the molding process (to avoid the need for "slides"), the knuckle 117 is actually staggered along the transverse width of the edge 114 (somewhat like a hinge), with alternating sections of the edge 114 looking exactly like depicted here, and the other alternating sections having a flat top surface. As can be clearly seen from FIG. 3 above, the female edge 112 is cooperatively designed such that this alternating hinge-like design is mirrored by the female edge 112.

The knuckle 117 has a generally circular cross-section, but with opposing parallel flat surfaces 121 creating an angled top and bottom surface to the knuckle 117. The knuckle 117 has the same thickness between these flat surfaces 121 as the mouth 123 of the female edge 112. The mouth 123 opens to a transverse void 113 formed within the alternating sections of the female edge 112.

To engage or disengage two adjacent segments 16 to or from one another, the male-edge-sided deck segment 16 (on the left here) must be angled until the flat surfaces 121 are coplanar with the top and bottom surfaces 118 and 119, respectively of the female-edge-sided deck segment 16 (on the right here). The knuckle 117 will then pass easily through the mouth 123 and into the transverse void 113. Once in place, the male-edge-sided deck segment 16 is rotated in direction R until the top surface 118 of both segments 16 are flush with relation to one another. The shoulders 127A and 127B created at the transition in the knuckle 117 between a rounded portion and the flat surfaces 121. These shoulders 127A and 127B interact with slight lips created at the mouth of the transverse void 113 to prevent the interlocked segments 16 from being pulled apart in the longitudinal direction. The sliding rods would then be placed in the extended position to retain the top surfaces 118 segments in a flush condition.

To disassemble the interlocked hinge 126 (although it is not intended to operate like a hinge in normal conditions, only when assembling/disassembling the deck), the slidable rods are placed in the stowed position, allowing the panel on the left in this FIG. 6B to be rotated counter-clockwise until the flat surfaces 121 are aligned and parallel with the top and bottom surface 118, 119 of the segments 16. The segments 16 can now be pulled apart.

Continued testing and prototyping has resulted in the development of an eighth embodiment of the trailer of the current invention. This eighth version is quite similar to that described herein as the seventh embodiment, but with critical improvements and developments that provides still further utility and ease of use. We will begin to describe this new embodiment with FIGS. 7A-7C.

Figure 7A:
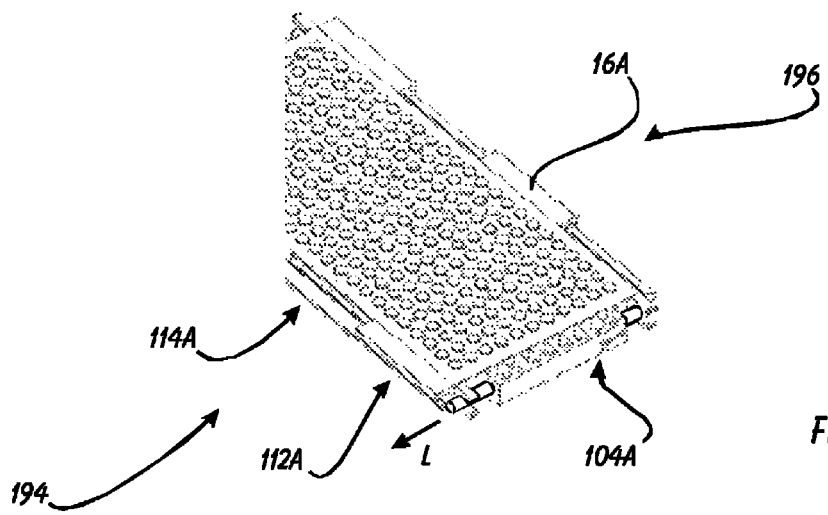
FIGS. 7A, 7B and 7C are partial perspective views of deck segments of the trailer of FIG. 9.
Figure 7B:
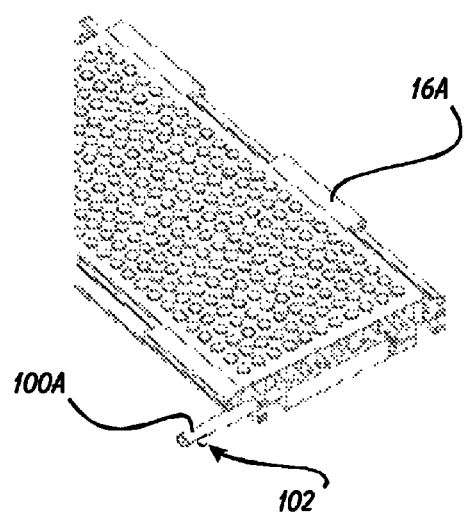
Figure 7C:
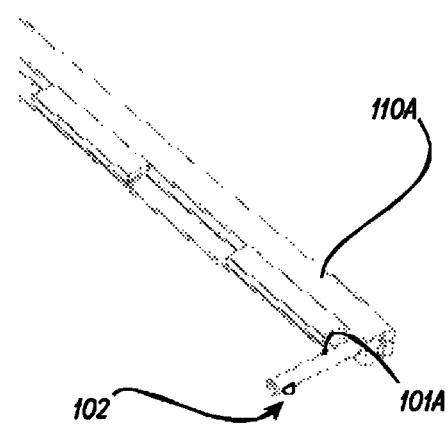
Figure 9:
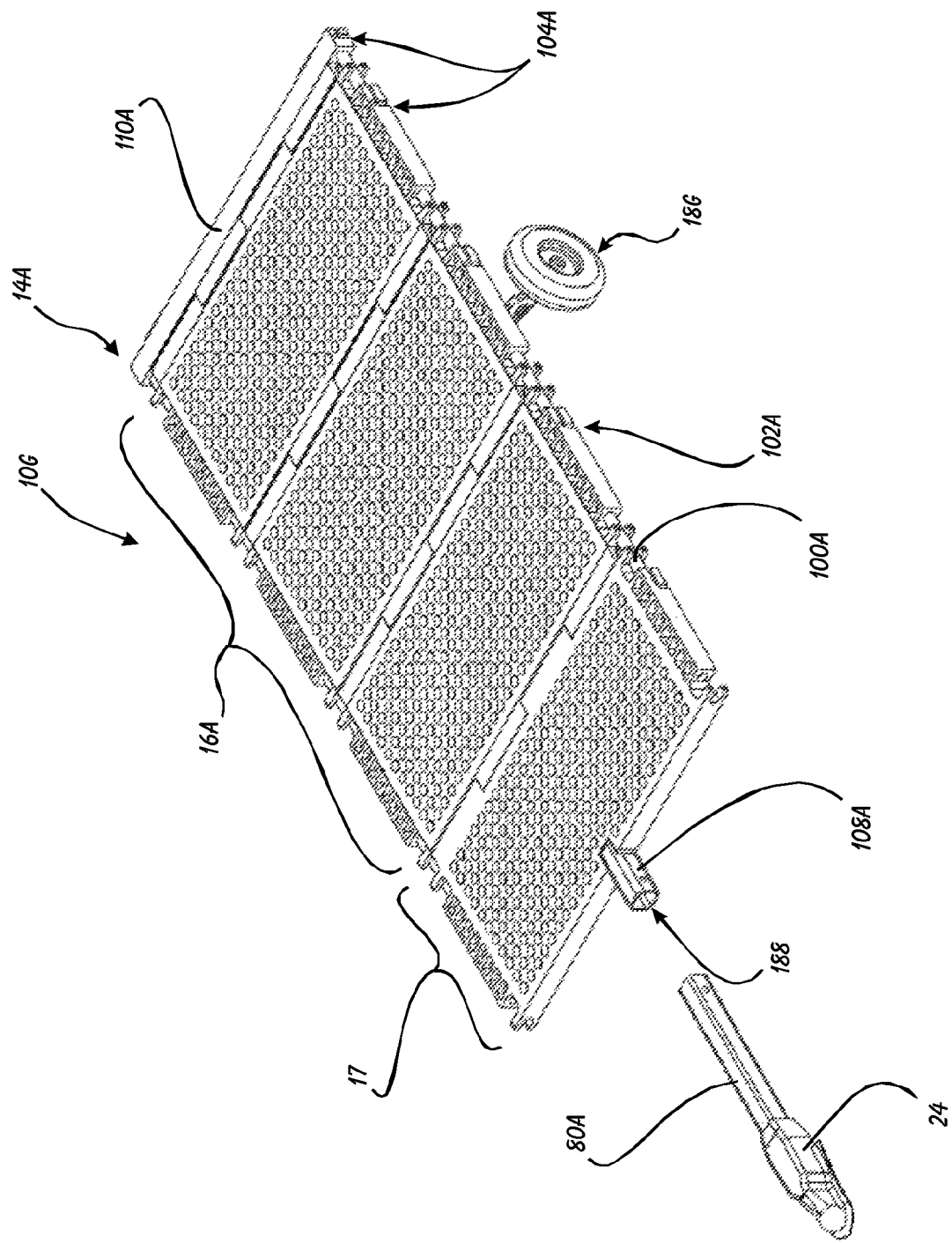
FIG. 9 is a partially exploded perspective view of an eighth embodiment of the trailer of the present invention.

FIGS. 7A, 7B and 7C are partial perspective views of deck segments 16A and the lighting adapter 110A of the trailer of FIG. 9. The deck segments 16A are similar to, but have critical distinctions as compared to those segments of the trailer embodiment of FIG. 2.

One distinction between these segments 16A and those of the prior embodiment is that there are no strictly "male" or "female" panel edges. The leading and trailing edges of each panel are, instead, made up of alternating sections of male and female structure. The leading edge 194, for example, is made up of a female edge portion 112A at the left side. A male edge portion 114A borders the first female edge portion 112A. The leading edge 194 alternates between female 112A and male 114A edges across the width of the deck segment 16A. As should be apparent, the trailing edge 196 will comprise alternating male 114A and female 112A edge portions in the opposite sequence to that of the leading edge 194. Of course this is so that the leading edge 194 will interlock with the trailing edge 196 of a deck segment 16A having the identical design.

The alternating of the male and female edge portions accomplishes as least three objectives. First, the breaking up of the structural profile of the leading 194 and trailing 196 edges of the segments 16A is expected to increase the strength of the deck segments 16A along the leading and trailing edges, since there will not be long, continuous structural features across the width of the edges 194, 196.

Second, alternating the gender of the edge portions will assist in the alignment of the interlocking segments 16A to one another when they are being attached to one another. Furthermore, the alternating gender will resist any relative transverse sliding between adjacent deck segments 16A.

Finally, as will be described further below in connection with other drawing figures, the alternating of genders will assist in the orientation of the different segments 16A and the lighting adapter 110A so that other arrangements or configurations of the elements will be easier to assemble without the need for extensive instructions or care.

Another distinction from the instant design and that of the prior embodiment is related to the slidable rods 100A. Comparing the view of FIG. 7A to that of FIG. 7B, we can see that the slidable rods 100A of this design slide forward (towards the front of the assembled trailer—in direction "L"), rather than backwards (as was the case with the prior design). Just as with the prior design, the rods 100A have at least one actuating handle 102 extending from it that is designed to engage the handle pocket 104A in either its native segment 16A, or in the adjacent segment 16A when the segments are interconnected The lighting adapter 110A is much narrower (front-to-back) than a full deck segment 16A, so a full-length slidable rod 100A will not work properly. As a result, half-rods 101A take the place of normal slidable rods 100A. The half-rods 101A are not necessarily one-half the length of the normal slidable rods 100A; their length will depend upon the width of the lighting adapter 110A. The half-rods 101A must be of the proper length so that their actuating handles 102 will engage the handle pocket 104A of the panel segment to which the lighting adapter 110A is attached. As shown, the leading edge of the lighting adapter 110A is also comprised of alternating male and female edge portions 114A, 112A. FIGS. 8A-8C depict additional design changes in the current embodiment.

FIGS. 8A, 8B and 8C are partial cutaway side views of deck segments 16A of the trailer of FIG. 9. By way of example, the segments 16A depicted here are cutaway until only one male edge portion 114A and one female edge portion 112A is visible at the leading and trailing edge of the segment 16A. As discussed above in connection with FIGS. 7A-7C, the male and female edge portions 114A, 112A alternate across the width of the segments 16A (and lighting adapter 110A).

There have been some structural design changes to the instant design as compared to that depicted in FIGS. 2-5 (from the parent application). The mouth 123A defines a wider opening into the transverse void portion 113A (of the female edge portions 112A).

Widening the mouth 123A results in shoulders 127AA, 127BA and 127CA that are thicker than with the prior design. This additional thickness of the shoulders 127AA-127CA adds strength to the female feature of the segment 16A, while also making it easier to engage the segments 16A to one another.

Furthermore, the knuckle 117A (of the male edge portions 114A) has a thicker "neck" than in the previous design. The thicker neck 190A adds strength to the male features without obstructing the smooth assembly and disassembly of the interlocked hinge portion 126A. In the depicted version, there is only a single flat surface 121 on the upper face of the knuckle 117A. Just as with the prior design, once the knuckle 117A has been inserted into the transverse void portion 113A, the panel segments 16A are rotated relatively (in direction "R") until the top surfaces 118 and bottom surfaces 119 are relatively coplanar, at which time the slidable rods (see FIGS. 7A-7C) are slid across to the adjacent segment and then locked. FIG. 9 depicts the assembled trailer.

FIG. 9 is a partially exploded perspective view of an eighth embodiment of the trailer 10G of the present invention. Distinctions shown here as compared with the prior embodiment relate to the suspension assembly 18G, the head segment 17 and the hitch elements. As shown, the trailer 18G is made up of a plurality of deck segments 16A, 17 and lighting adapter 110A interconnected as previously described to form a trailer deck 14A, with the slidable rods 110A each engaging the adjacent elements to form a structurally strong platform.

The suspension assembly 18G has a in this version comprises a pair of independently-folding frames that can be easily folded or unfolded when assembling or disassembling the trailer 10G. Further detail regarding the suspension assembly 18G will be provided below in connection with FIGS. 12A and 12B.

Figure 10:
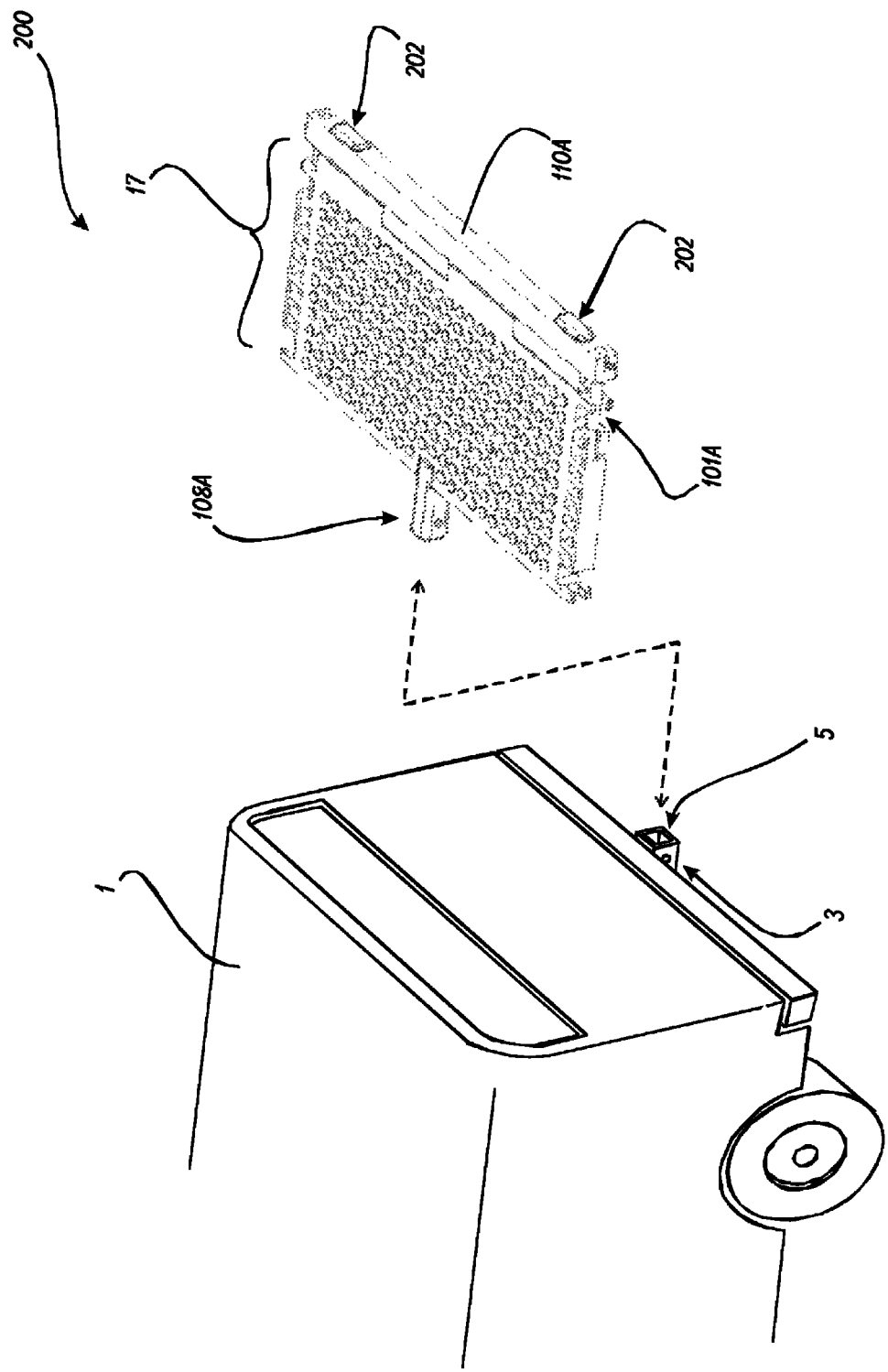
FIG. 10 is a perspective view of a cargo platform configuration of the trailer of FIG. 9 as it would attach to a conventional vehicle.

The head segment 17 is effectively a combination of the prior hitch adapter 106 and a full-sized panel segment 16A. The result is a segment that has an integrated male receiver socket 108A. The receiver socket 108A is described as being "male," although it actually function as both a male and female gender, depending upon what it is engaging. It is actually of female gender when a male hitch strut 80A is inserted into its bore 188. The strut 80A and the receiver socket 108A both have corresponding apertures formed in their sides so that a pin can be inserted through them to retain them together when the two are engaged. As with the prior trailer design, the male hitch strut 80A terminates at its leading end in the hitch socket 24. Although not explicitly depicted here, it should be understood that the bore 188 may actually extend further into the head segment 17 (i.e. past the depth of the receiver socket 108A). Such an arrangement would improve the strength of the head segment 17, which very well may be made from a plastic material, by adding the strength of the hitch strut 80A, which is most likely made from steel. FIG. 10 depicts an additional utility provided by the instant trailer design.

FIG. 10 is a perspective view of a cargo platform 200 configuration of the trailer of FIG. 9 as it would attach to a conventional vehicle 1. The cargo platform 200 is made from an interlocked combination of the head segment 17 and the lighting adapter 110A. These panels are held together by the hinge features and the engaged half-rods 101A. As shown, there are tail lights 202 on the trailing edge of the cargo platform 200 that are connected to the vehicle 1 so that they light, as appropriate, when attached to the vehicle's electrical tail light system.

The male receiver socket 108A is dimensioned to function as a male gendered element in this operational configuration. It has its outer surfaces dimensioned so that it can be inserted into the female bore 5 of a conventional trailer hitch receiver 5.

Figure 11:
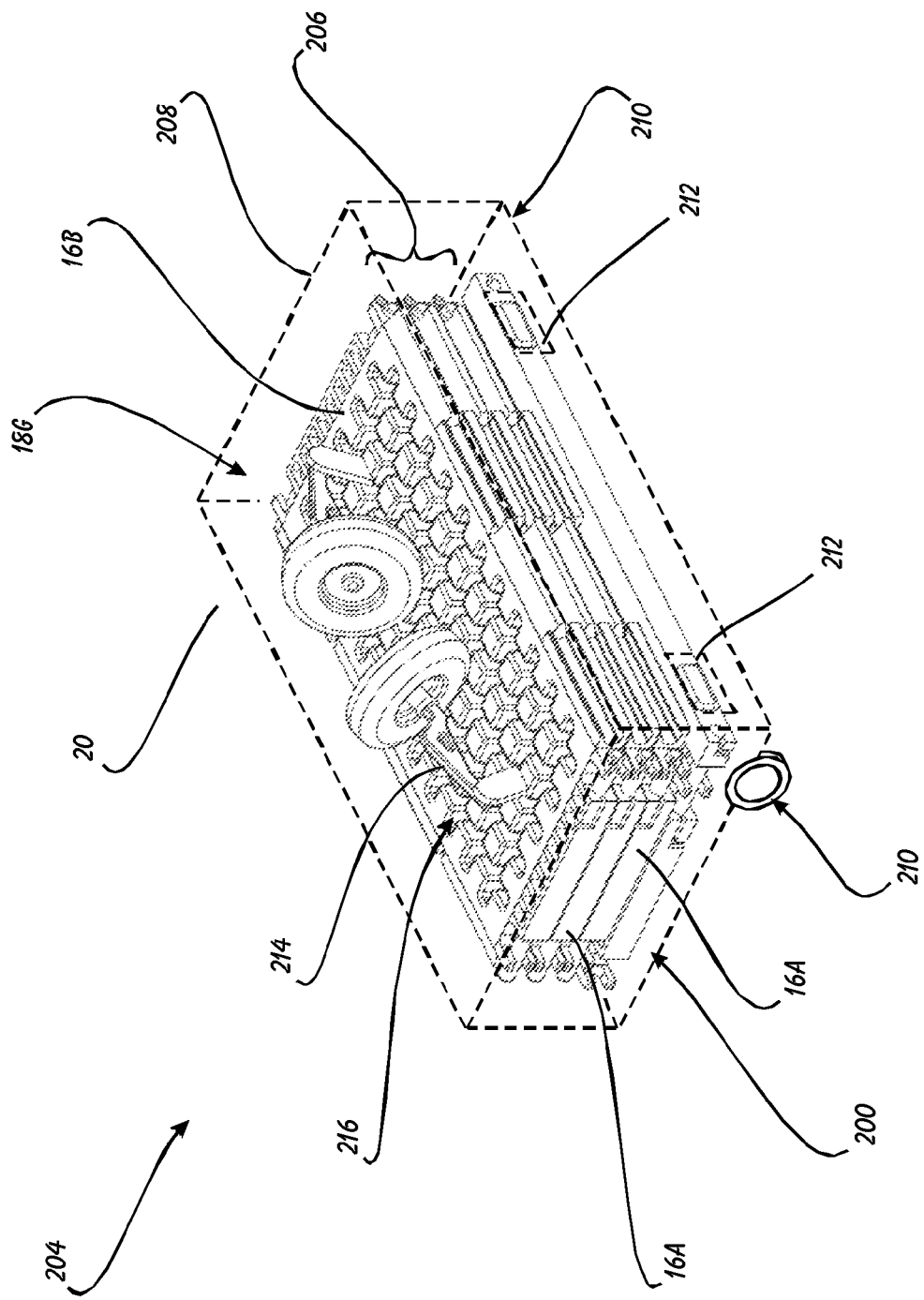
FIG. 11 is a perspective view of the trailer of FIGS. 9 and 10 in a preferred packaged condition.

Ideally, this would be a two inch receiver, which is the conventional dimension for utility hitch receivers for trucks. In the event that a smaller diameter bore 5 exists on the vehicle 1 (e.g. for a 1.5 inch hitch), an adapter could be inserted into the male receiver socket 108A and then into the bore 5. In other words, the adapter would either accept the male receiver socket 108A within its bore, or would have an outer profile that would fit inside the bore 188. The opposing end of the adapter would then fit within the receiver female bore 5. FIG. 11 expands upon the cargo platform functionality.

FIG. 11 is a perspective view of the trailer of FIGS. 9 and 10 in a preferred packaged condition 204. The cargo platform 200 (the head segment and lighting adapter) would normally be at the bottom of the package 204. One or more deck segments 16A, formed in a stack 206 are placed atop the cargo platform 200. The top deck segment in the stack 206 for the trailer depicted in FIG. 9 would be the suspension deck segment 16B. The suspension deck segment 16B would generally be a regular segment 16A, but with the suspension assembly (e.g. 18G) attached to it.

Here, the pivoting suspension frames 214 for each wheel assembly 20 has been folded in around their respective pivot axes 216 so that the wheels are located above the bottom of the suspension deck segment 16B.

The stack 206 would be bound together in some convenient fashion. Here, the stack 206 is enclosed within storage container 208. The storage container 208 (shown in dashed lines) is a hard- or soft-sided container that can hold the package within it. There could be two or more transport wheels 210 protruding from the bottom, rear of the package 204, which will facilitate moving the package 204 around when not attached to a vehicle (such as in the user's garage). The transport wheels 210 could be of some conventional design, such as those used on in skates, scooters and the like. When rolled into the proper location, the package 204 could be tilted up so that the bottom of the stack 206 (i.e. to the reader's right in this depiction) faces the floor.

In order to accommodate the package 204 being transported on the vehicle trailer hitch, the storage container 208 may further be provided with clear lenses 212 or apertures over the lights on the lighting adapter (of the cargo platform 200), so that the lights can be seen by following vehicles. Similarly, an aperture would be provided at the front side of the storage container 208 so that the mail receiver socket 108A can protrude through it—to either attach to the vehicle, or to be used as a handle when the user is rolling the package 208 around. Finally, we will turn to FIGS. 12A and 12B to further examine the suspension system.

Figure 12A:
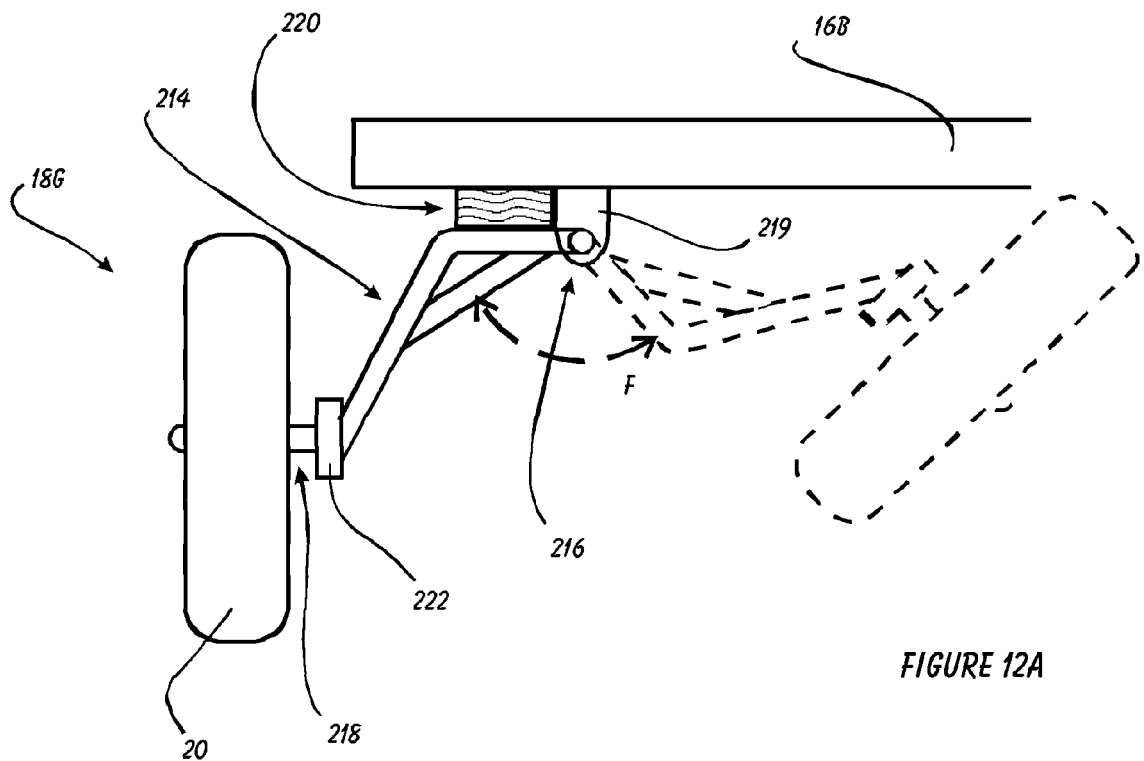
FIGS. 12A and 12B are cutaway front and side views, respectively, of a suspension assembly of the trailer of the present embodiment.
Figure 12B:
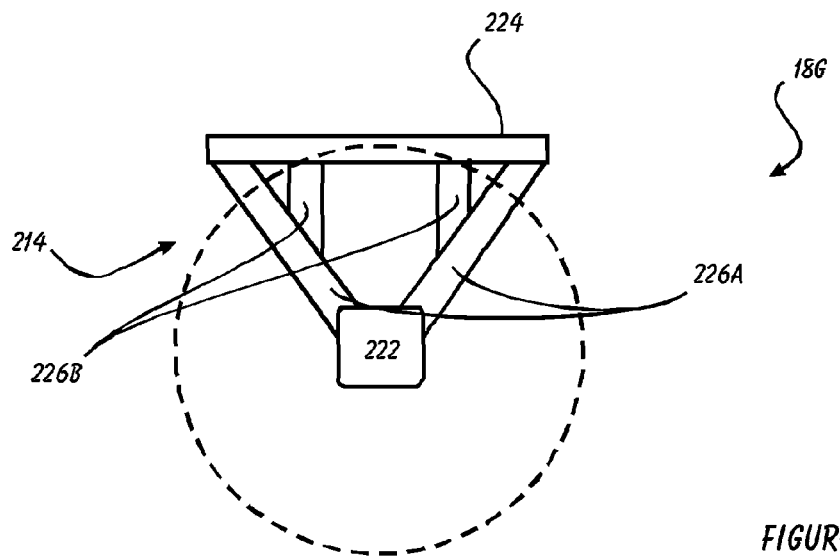

FIGS. 12A and 12B are cutaway front and side views, respectively, of a suspension assembly 18G of the trailer of the present embodiment. The wheels 20 are attached by axle 218 to hub base 222. The hub base 222 extends from pivoting suspension frame 214, which is pivotally attached to the base of the suspension segment 16B. The dashed lines depict the preferred position of the suspension assembly 18G when it is in the stowed position. The solid lines show the assembly 18G in the "in-use" position. The assembly moves between the two position according to direction "F."

The base bracket or brackets 219 extend from either the bottom surface of the suspension deck segment 16B, or from a backing plate (not shown) that could be used to provide further strength and rigidity to the suspension segment 16B. The pivot axis 216 is around the pivot axle 224, which is retained to the segment/backing plate by the base brackets 219. When in the "in-use" position, support and dampening is provided by one or more dampener elements 220 that are squeezed between the suspension frame 214 and the segment/ backing plate. The dampener elements 220 could be of simple construction, such as being made from a selected rubberized material that has the desired hardness to provide the necessary cushioning to the ride. In more complex versions, the dampening elements 220 could be shock absorbers, combination springs/shocks, or even inflatable bladders. The dampener elements 220 could be attached to either the deck 16B/backing plate, or to the suspension frame 214.

A wide variety of structures for the frames 214 could be utilized beyond that depicted here, but one preferred form is to have a pair of angled struts 226A intersecting at the hub base 222. The angled struts 226A could be bent as shown so that they are braced against the dampener elements 220. Straight struts 226B could be included for further strength and durability.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A collapsible trailer, comprising: a deck comprising three interlocked deck segments, each said deck segment comprising opposing interlocking edges, each said interlocking edge defined by alternating male and female edge portions, said female and male interlocking edge portions cooperating to be interlockable one with another of an adjacent segment; a suspension assembly attached to a bottom side of one said deck segment; and a hitch strut extending forward from said deck;
   said trailer further comprising a head segment defined by a male receiver socket at its leading edge and said alternating male and female interlocking edge portions at an opposing trailing edge, said male receiver socket defined by a bore formed therein.

2. The trailer of claim 1, wherein said deck comprises three interlocked segment assemblies, each said assembly comprising one said deck segment and a pair of slidable rods slidingly engaging a pair of rod bores formed in said deck segments.

3. The trailer of claim 2, wherein each said deck segment comprises opposing side edges, one said rod bore is formed to run longitudinally along each said opposing side edge.

4. The trailer of claim 3, wherein each said rod bore defines a leading end and a trailing end, said side edges further being defined by a slot formed therein to reach said rod bore at both said leading end and said trailing end.

5. The trailer of claim 4, wherein said leading end slot terminates in a handle pocket formed therein.

6. The trailer of claim 5, wherein each said slidable rod further comprises an actuating handle extending therefrom, said handle pockets formed in said side edges of said segments cooperatively configured to accept said actuating handles therein.

7. The trailer of claim 6, further comprising a lighting adapter attached a trailing edge of one said deck segment or said head segment, said lighting adapter further comprising trailer lamps displayed therefrom.

8. The trailer of claim 7, wherein said bore of said male receiver socket is configured to accept a hitch strut therein.

9. The trailer of claim 8, wherein each said female edge portion defines a cross-section having a generally circular central bore void.

10. The trailer of claim 9, wherein each said male edge portion defines a cross-section having a protruding knuckle appendage.

11. The trailer of claim 10, wherein said protruding knuckle appendage defines an axis that is aligned transverse to said longitudinal bore.

12. The trailer of claim 11, wherein said central bore void is accessed through a mouth, said mouth defining a gap, said gap being equal to or slightly greater than a distance between opposing faces of said protruding knuckle appendage.

13. A horizontal load-bearing structure, comprising: a plurality of interlocked deck segment elements, each said deck segment element comprising: a flat shape defining a front edge, a rear edge opposing said front edge, said front and rear edges both comprising alternating male and female interlocking edge portions, said deck segment elements further defined by a pair of opposing side edges perpendicular to said front and rear edges; whereby said front and rear edges are cooperatively configured such that said male edge portions insert into said female edge portions to form an interlocked hinge between a pair of said interlocked deck segment elements,
   said structure further comprising a head segment defined by a male receiver socket at its leading edge and said alternating male and female interlocking edge portions at an opposing trailing edge, said male receiver socket defined by a bore formed therein.

14. The structure of claim 13, wherein each said side edge comprises a longitudinal bore formed therein along said edge, each said deck segment element further comprising an elongate rod slidably inserted into said longitudinal bore and extending substantially from said rear edge to said front edge.

15. The structure of claim 14, wherein each said deck segment element defines a top surface in spaced parallel relation with a bottom surface, said top and bottom surfaces defining a horizontal deck plane, said flat transverse surfaces lying in the same horizontal plane as said top and bottom surfaces in a transverse direction, and lying in a different plane than said horizontal plane in a longitudinal direction.

16. The structure of claim 14, wherein each said female edge portion is defined by a transverse void across substantially its entire width, said transverse void accessible through a mouth formed by said female edge portion, one said male edge portion insertible into said transverse void through said mouth.

17. The structure of claim 16 further comprising a pair of suspension assemblies extending from said bottom surface of at least one said deck segment, each said suspension assembly comprising a pivoting frame pivoting around a pivot axis from an in-use position to a stowed position.

18. The structure of claim 17, wherein each said suspension assembly comprises a dampening element compressed between said pivoting frame and said deck segment to which said suspension assemblies are attached when each said assembly is in said in-use position.

* * * * *